United States Patent
Bourges-Sevenier

(10) Patent No.: US 6,693,645 B2
(45) Date of Patent: Feb. 17, 2004

(54) OPTIMIZED BIFS ENCODER

(75) Inventor: Mikael Bourges-Sevenier, Santa Clara, CA (US)

(73) Assignee: iVast, Inc., Santa Clara, CA (US)

(*) Notice: Subject to any disclaimer, the term of this patent is extended or adjusted under 35 U.S.C. 154(b) by 333 days.

(21) Appl. No.: 09/727,800

(22) Filed: Nov. 30, 2000

(65) Prior Publication Data

US 2002/0083032 A1 Jun. 27, 2002

Related U.S. Application Data

(60) Provisional application No. 60/168,778, filed on Dec. 1, 1999.

(51) Int. Cl.[7] .............................................. G06T 15/00
(52) U.S. Cl. ...................................................... 345/619
(58) Field of Search ................................ 345/419, 619, 345/440, 428; 707/1, 100, 101

(56) References Cited

U.S. PATENT DOCUMENTS

| 6,075,901 A | * | 6/2000 | Signes et al. ............... 382/251 |
| 6,377,309 B1 | * | 4/2002 | Ito et al. ..................... 348/554 |
| 6,438,266 B1 | * | 8/2002 | Bajaj et al. ................. 382/243 |

OTHER PUBLICATIONS

Signes, "Binary Format for Scene (BIFS): Combining MPEG–4 Media to Build Rich Multimedia Services", XP–002160811. Jan. 1999.

Liu et al., "Video Compression using Quadtree Sigementation and Component Quantization", Apr. 27, 1993, School of Electrical Engineering, Georgia Institute of Technology, Atlanta, GA 30332, pp. V–429–V–432.

Eleftheriadis, "MPEG–4 Systems: Architecting Object–Based Audio–Visual Content," Dept. of Electrical Engineering, Columbia University, New York, NY 10027, XP–002160812. Jul. 1998.

* cited by examiner

Primary Examiner—Phu K. Nguyen
(74) Attorney, Agent, or Firm—Ronald L. Yin; Gray Cary Ware & Freidenrich

(57) ABSTRACT

An apparatus and method of processing a data file, by determining a range of values assumed by parameters in a hierarchy of nodes. The processing includes calculating a quantization parameter, based on an acceptable distortion level, indicating a desired number of bits, to represent the value range of each parameter for each node. Each node is examined to determine if a change in quantization parameter for a node parameter is desired, and if so a quantization parameter is inserted into the node. Then the hierarchy is reviewed, examining the quantization parameter at each node of the hierarchy and determining if one or more quantization parameters at a child node of the node being examined can be subsumed under the examined node quantization parameter. Quantization parameters are also used to encode animation data. The animation data, or frames, may be encoded into a sequence of Intra frames and Predictive frames. An Intra frame establishes quantization parameters used for subsequent predictive frames.

60 Claims, 8 Drawing Sheets

OPTIMIZED BIFS ENCODER

REFERENCE TO PRIORITY DOCUMENT

This application claims the benefit of U.S. Provisional Application No. 60/168,778, filed on Dec. 1, 1999.

BACKGROUND OF THE INVENTION

1. Field of the Invention

This invention relates to computer representation of data and, more particularly, to conversion of text-based data representations into numerical, binary representations.

2. Description of the Related Art

Graphic artists, illustrators, and other multimedia content providers have been using computer graphics and audio techniques to provide computer users with increasingly refined presentations and, more recently, have begun to provide three-dimensional (3D) graphics and multimedia works. Such presentations and multimedia works may be represented by data in one or more files, in a variety of formats such as video, graphical, and audio data formats. Typically, a relatively large amount of data is needed to satisfactorily represent 3D or multimedia works, resulting in large data files. Content providers must be cognizant of the size of these data files, due to the impact of large file size on data storage requirements and on the transfer of data over a network such as the Internet.

Although advances in data storage technology have been made to facilitate storage of larger files, such as disk drives with higher storage densities, it is still advantageous to reduce the amount of data storage required for any works or documents, thereby allowing more works and documents to be stored on a given storage device. In addition, even though data networks have been constructed to support faster file transfer speeds, the rate at which data files are growing in size is still outpacing the rate at which the file transfer speeds are increasing. Consequently, to control the size of data files, multimedia content providers may be forced to use smaller 3D graphics and multimedia files, with lower presentation quality, to permit compact storage of files and efficient transfer of the files across networks.

The data storage and network constraints described above are not acceptable for applications where large 3D graphics and multimedia data files must be stored and transferred. Therefore, conversion of 3D and multimedia data files into a more efficient, smaller, data file is desirable.

SUMMARY OF THE INVENTION

A data file that specifies a hierarchy of nodes is processed such that a range of values assumed by node parameters is determined. The hierarchy of nodes includes a grouping, or parent, node that is followed by children nodes, where the nodes are specified by the data file. The processing includes determining a quantization parameter that indicates the number of bits that will be used to represent the value range of desired parameters for each node. To begin, the data file is first processed by examining each node in the hierarchy and determining if a change in quantization for a node parameter is desired. If so, a quantization parameter with the desired value is inserted into the hierarchy at the node, producing a quantized hierarchy. Then the quantized hierarchy is reviewed, examining the quantization parameter at each node of the hierarchy and determining if one or more quantization parameters at a child node of the node being examined can be subsumed under the quantization parameter of the examined node without detrimental affect to the representation of the node parameters. If the child quantization parameter can be subsumed, then the child node quantization parameter is deleted from the quantized hierarchy. In this way, the processed hierarchy occupies fewer data bits, without sacrificing presentation quality.

The techniques in accordance with the invention may be applied to data files representing scene graphs of command files that describe virtual worlds, and also to animation files. The determination of quantization parameters may be performed according to a desired performance parameter, such as, an acceptable distortion level in the resulting scene or an acceptable, or achievable, data rate. The value indicating an acceptable distortion level may be received from a user, or may be a predetermined value, or may be calculated in response to the node parameter being represented. The data rate may be received from a user, may be a predetermined value, or may be calculated in response to the node parameter being represented.

Other features and advantages of the present invention should be apparent from the following description of the preferred embodiments, which illustrate, by way of example, the principles of the invention.

DETAILED DESCRIPTION

In accordance with the present invention, a scene graph of nodes is efficiently converted from an inefficient representation, such as a text description, to an efficient parametric representation that can be adjusted to limit the number of data bits used to represent the node parameters. A method and apparatus constructed in accordance with the present invention can be utilized in systems for 3D and multimedia presentation. The invention is especially suited for virtual reality applications and scene rendering.

Scene Description

It is noted that the increased sophistication of computer users has increased the demand for multimedia and computer three-dimensional (3D) graphics. In response, content providers now commonly use multimedia data that may include video, audio, animation as well as 3D graphics into their products. Conventional computer 3D graphics and multimedia processing includes modeling and rendering. Modeling involves creating 3D representations of objects and arranging them into a scene for viewing by a computer user. A scene is commonly referred to as a "world" or "universe." Rendering is a process by which content is actually displayed on-screen to the user. The location of objects within a scene may be defined by points, lines, polygons, and curves in a three-dimensional coordinate system.

Typically, objects are represented by three-dimensional coordinate values that describe a location relative to three axes that define a 3D space, for example, an X-axis (width), a Y-axis (height), and a Z-axis (depth). Properties associated with objects, such as, for example, color, texture, reflectivity, and transparency may be represented by data parameters. In addition, data parameters may contain information related to the scene, for example, light source location and camera position.

Content developers generally use a text-based language to describe or model a scene for computer representation. One such text-based language is referred to as Virtual Reality Modeling Language (VRML). Another such text-based language is referred to as Extensible Markup Language (XML). Both the VRML and XML specifications may be found on the Internet at the "World Wide Web" URL of www.web3d.org/fs_specifications.htm. A text-based language provides the content developer with an easily understandable method of modeling a scene, in contrast to machine readable data used by computer hardware to render the display.

Typically, a text-based language will list the data parameters associated with a particular object, or group of objects, in a common location. Generally, these data parameters may be represented as "nodes." Nodes are self-contained bodies of code that describe the state and behavior of a display object, i.e., how an object looks and acts.

Figure 1:
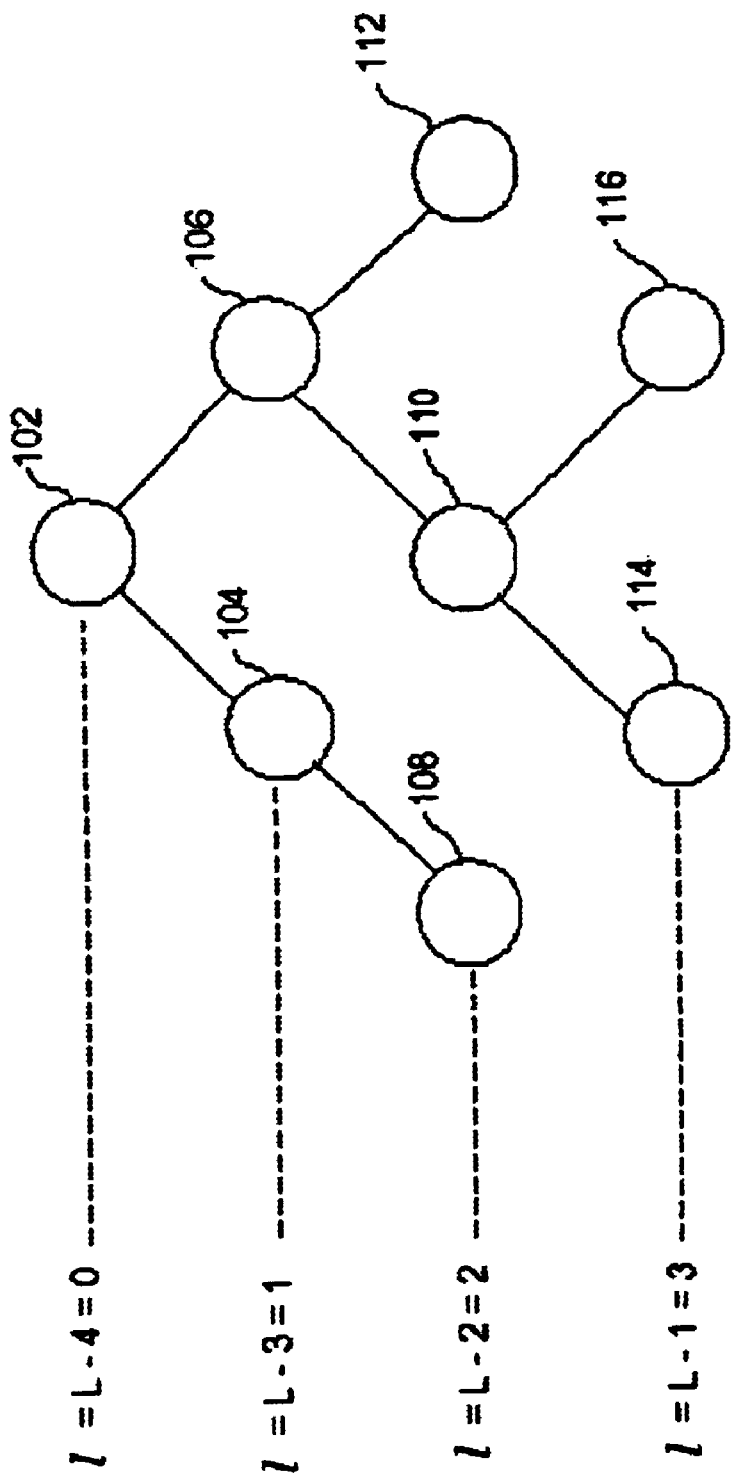
FIG. 1 is a scene graph illustrating a hierarchical data structure.

Nodes are typically organized in a tree-like hierarchical data structure commonly called a scene graph. FIG. 1 shows a scene graph illustrating the hierarchical data structure. The scene graph illustrated in FIG. 1 is a node hierarchy that has a top "grouping" or "parent" node 102. All other nodes are descendents of the top grouping node 102. The grouping node is defined as level 0 in the hierarchy. In the simple scene graph illustrated in FIG. 1, there are two "children" nodes 104 and 106 below the top parent node 102. A particular node can be both a parent node and a child node. A particular node will be a parent node to the nodes below it in the hierarchy, and will be a child node to the nodes above it in the hierarchy. As shown in FIG. 1, the node 104 is a child to the parent node 102 above it, and is a parent node to the child node 108 below it. Similarly, the node 106 is a child node to the parent node 102 above it and is a parent node to the child nodes 110 and 112 below it. Nodes 108, 110, and 112 are all at the same level, referred to as level 2, in the hierarchical data structure. Finally, node 110, which is a child to the parent node 106, is a parent node to the child nodes 114 and 116 at level 3.

FIG. 1 is a very simple scene graph that illustrates the relationship between parent and child nodes. A typical scene graph may contain hundreds, thousands, or more nodes. In many text-based scene descriptive languages, a parent node will be associated with various parameters that will also affect the children of that parent node, unless the parent node parameters are overridden by substitute parameters that are set at the child nodes. For example, if the parameter that defines the "3D origin" value of the parent node 106 is translated along the X-axis by two (2) units, then all objects contained in the children of the node 106 (nodes 110, 112, 114, and 116) will also have their origin translated along the X-axis by two (2) units. If it is not desired to render an object contained in the node 114 so it is translated to this new origin, then the node 114 may be altered to contain a new set of parameters that establishes the origin for the node 114 at a different location.

Use of scene graphs provides content developers with a convenient mechanism for managing 3D scene and multimedia information. Organization of the scene description in a scene graph provides a graphical representation of the scene in a format that is easily understood by content developers.

Binary Representation

While text-based languages and scene graphs provide convenient tools for content developers in representing a 3D scene or a multimedia presentation, they are not efficient for the storage of files or the transfer of files across a network. A result of this inefficiency is that very large data files are generated to represent these types of content. Using large data files leads to an increase in data storage requirements, as well as an increase in download time of files that are sent over a network, and can make "streaming" of the files slow or impractical. To decrease file size, the text-based language or multimedia information can be converted to a binary format.

One binary format for the representation of scene information is referred to as Binary Format for Scenes (BIFS). BIFS is part of the Motion Picture Experts Group version 4 specification (MPEG-4), an international data standard that addresses the coded representation of both natural and synthetic (i.e., computer-generated) graphics, audio, and visual objects. The MPEG-4 specification can be found on the Internet at the MPEG Web site home page at the "Word Wide Web" URL of www.cselt.it/mpeg/.

MPEG-4 provides a specification for how data objects can be composed together to form a scene, and how a user can interact with the scene. In addition, MPEG-4 addresses storage and transmission of scene data. Within the MPEG-4 specification, BIFS, a highly compressed binary format, is the format used for describing and dynamically changing scenes.

Selection of Quantization Parameters

As discussed above, computer 3D graphics and multimedia information are often developed using a text-based scene description language, such as VRML. The text-based language files may be converted, or encoded, into a binary format, such as BIFS, to decrease the file size. In accordance with the invention, quantization parameters of a BIFS representation are automatically selected, allowing conversion into binary format in an efficient manner so as to minimize the size of the BIFS data file, while maintaining scene information.

Thus, a data file containing a node hierarchy representing a scene, such as a VRML file, is processed, or converted to BIFS format, by examining each node in the hierarchy and determining if a change in quantization parameter for a node is desired. If so, a quantization parameter with the desired value is inserted into the hierarchy at the node, producing a quantized hierarchy. Generally the quantization parameters are global, such that a parent node establishes a default quantization parameter for the children nodes of the parent node. In BIFS, a quantization parameter node can be specified as local. If quantization parameters are specified as local then the parameters apply only to the next node in the hierarchy.

After the quantization hierarchy is produced, the quantized hierarchy is reviewed, examining the quantization parameter at each node of the hierarchy and determining if one or more quantization parameters at a child node of the node being examined can be subsumed under the quantization parameter of the examined node without detrimental affect to the presentation quality of the resulting scene. If the child quantization parameter can be subsumed, then the child node quantization parameter is deleted from the quantized hierarchy. That is, a child node quantization parameter is subsumed by a parent node if the system determines that the desired quantization of the child node can be achieved by the quantization parameters of the parent. Therefore, quantization parameters stored with the child node are unnecessary. In this way, the processed hierarchy occupies fewer data bits, without sacrificing presentation quality.

Calculation of the quantization parameters may include receiving a value indicating a desired performance parameter, such as, an acceptable distortion level, or an acceptable data rate. For example, the quantization parameters may be calculated in response to the range of values and the value indicating an acceptable distortion level. The value indicating an acceptable distortion level may be received from a user, or may be a predetermined value, or may be calculated in response to the parameter being represented. The calculation of the quantization parameters may be based on an acceptable data rate. The data rate may be received from a user, may be a predetermined value, or may be calculated in response to the parameter being represented. In addition, the performance parameter may be a value indicating either an acceptable distortion level or an acceptable data rate, and the quantization parameter may be determined so as to minimize the distortion level or the data rate, whichever was not received. The performance parameter may be a value indicating an acceptable distortion level and an acceptable data rate, and the quantization parameter may be determined so as to minimize the distortion level without exceeding the acceptable data rate. Or, the performance parameter may be a value indicating both an acceptable distortion level and an acceptable data rate, and the quantization parameter may be determined so as to minimize the data rate without exceeding the acceptable distortion level.

When determining if it is desirable to insert a quantization parameter node into the hierarchy where there was none before, the cost associated with inserting a quantization parameter may be compared with the cost of not inserting the quantization parameter. The cost of inserting a quantization parameter corresponds to the increased amount of data required to represent the quantization parameter itself. The cost of not inserting a quantization parameter corresponds to the decreased efficiency achieved through using the quantization parameter on its respective data field during the conversion. Therefore, when determining if one or more quantization parameters at a child node can be subsumed under the examined node quantization parameter, the hierarchy is reviewed, and the value of the quantization parameters at the child node are compared to the value of the quantization parameters at the examined (parent) node. If the associated cost is lower for the combined quantization parameters than for quantization parameters at the individual nodes, then the child quantization parameters are subsumed into the examined node quantization parameters.

Table 1 below lists examples of the costs associated with inserting a quantization parameter in a child node of a VRML file that is converted into a BIFS format. In the example shown in Table 1, there is a parent node and a single child node. This example can be better understood with reference to FIG. 1, for example, where a parent node is node 104 and a child node is node 108.

TABLE 1

Examples of Costs

| | Ex. 1 | Ex. 2 | Ex. 3 | Ex. 4 |
|---|---|---|---|---|
| Parent-QP | Default (32 bits) | Default (32 bits) | 20 bits | 20 bits |
| Child-QP | Default (32 bits) | 16 bits | 16 bits | Subsumed (20 bits) |
| Cost of Child-QP (bits in BIFS file) | 0 | 24 | 24 | 0 |
| Cost of Quantizing values (bits in BIFS file) | 96 | 48 | 48 | 60 |
| Total cost (bits in BIFS file) | 96 | 72 | 72 | 60 |

In the Table 1 examples, it is assumed that the child node includes three field values that would be affected by inserting a quantization parameter. Table 1 shows the analysis for various alternatives of inserting quantization parameters (QP) at the parent node or the child node. The top two rows of Table 1, labeled "Parent QP" and "Child QP", are the quantization parameters inserted into the parent and child nodes respectively. These quantization parameters determine the number of bits used to represent each of the three field values in the child node.

A default value, in this example thirty-two (32) bits, means that no quantization parameter is inserted. For the default, because there was no quantization parameter inserted into the node, and therefore no addition to the VRML file, there is no additional VRML description that needs to be converted to BIFS format, and thus there is no associated cost. In the examples where a quantization parameter is added, thus specifying the number of bits used for representing the field values, there is a corresponding addition to the VRML file. This results in an addition to the BIFS file, that may result in a larger BIFS file. An increase in the size of the BIFS file is represented as the additional bits added to the BIFS file corresponding to the additional VRML text added for the quantization parameter. In these examples it is assumed that the VRML text necessary to represent the addition of a quantization parameter results in a 24 bit increase in the corresponding BIFS file.

The third row of Table 1 lists the cost associated with specifying a quantization parameter at the child node, that is, a value other than the default value. As noted above, the cost is an increase of twenty-four (24) bits in the corresponding BIFS file. The fourth row of table 1 lists the cost associated with quantizing the three values in the child node with the corresponding quantization parameter. The cost of quantizing the three values in the child node corresponds to the number of bits required to represent the values in the BIFS file. The number of bits in the corresponding BIFS file equals the number of values quantized, multiplied by the quantization parameter used to quantize the values. The bottom row of Table 1 is the total cost, corresponding to the number of bits in the BIFS file used to represent the values plus any cost associated with the addition of a quantization parameter into the child node.

In Example 1, shown in Table 1, the default quantization parameters are used at both the parent and child nodes. As discussed previously, a default value in this example is thirty-two (32) bits. Because the default quantization parameter is used, there is no cost associated with inserting a quantization parameter at the child node. Thus, the three values in the child node are represented by three (3) thirty-two (32) bit fields for a total cost of ninety-six (96) bits.

In the remaining examples shown in Table 1, it is assumed that each of the three values in the child node can be adequately represented with a sixteen (16) bit value. Examples 2, 3, and 4 show the analysis performed by the encoder constructed in accordance with the invention.

In Example 2, the parent quantization parameter remains at the default value of thirty-two (32) bits. The column for Example 2 shows that, if a quantization parameter of sixteen (16) bits is inserted at the child node there is an associated cost, for example, twenty-four (24) bits to represent the inserted quantization parameter in BIFS format. Using the child node quantization parameter of sixteen (16) bits to quantize the three values in the child node results in a cost of forty-eight (48) bits (3 values×16 bits/value). Therefore, the total cost of Example 2 is seventy-two (72) bits, twenty-four (24) bits to represent the addition of the quantization parameter plus forty-eight (48) bits to represent the three values. As can be seen, this represents a significant reduction from the total cost of ninety-six (96) bits of the previous example.

The final two examples shown in Table 1 reflect the insertion of a quantization parameter corresponding to twenty (20) bits into the parent node. As discussed above, the addition of the quantization parameter in the parent node results in that quantization value being used in the child node, unless a new quantization parameter is inserted in the child node.

In Example 3, the parent node has a quantization parameter of twenty (20) bits and the child has a quantization parameter of sixteen (16) bits inserted into the VRML file. The addition of the quantization parameter into the child node will minimize the cost associated with quantization of the three values in the child node, because only sixteen (16) bits are required to adequately represent each value of the child node. Without inserting the quantization parameter into the child node, the parent node quantization parameter value of twenty (20) bits would be used to represent each value of the child node. However, there is a cost associated with inserting the quantization parameter in the child node, corresponding to an additional twenty-four (24) bits being added to the BIFS file to represent the quantization parameter. In Example 3, the cost associated with quantizing the three values in the child node is forty-eight (48) bits (3 values×16 bits/value). The total cost of Example 2 is seventy-two (72) bits, twenty-four (24) bits to represent the addition of the quantization parameter plus forty-eight (48) bits to represent the three values.

In Example 4, the parent node again has a quantization parameter of twenty (20) bits. But in this example, the child quantization parameter has been subsumed into the parent quantization parameter. Thus there is no quantization parameter added to the node and there is no longer a cost for adding a quantization parameter associated with the child node. The cost of quantizing the three values in the child node is sixty (60) bits (3 values×20 bits/value), because the parent quantization parameter of twenty (20) bits is used. The total cost associated with Example 3 is sixty (60) bits.

Figure 2:
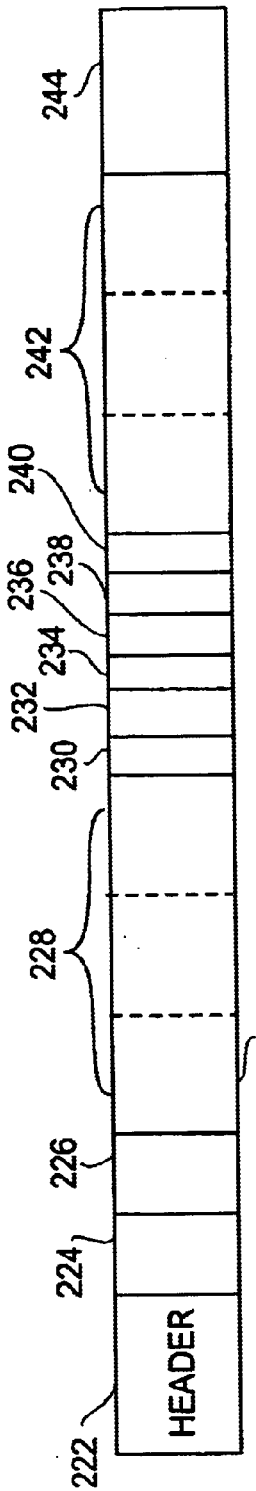
FIG. 2 is a diagram illustrating conversion of a text based scene descriptive language into a binary format.

Example 2 in Table 1 illustrates how use of quantization parameters in children nodes can lead to a reduced total cost when compared to using default values. However, as illustrated in Examples 3 and 4 in Table 1, the cost of inserting a quantization parameter to achieve a minimum acceptable representation in a child node may not always minimize the total cost. As illustrated in Example 4 of Table 1, in some situations the total cost can be reduced if the child quantization parameter is subsumed into the parent quantization parameter, so that the parent node quantization parameter is used for the child node, even though the number of bits used for quantization of the values in the child node is not minimized Quantization parameters are also used to encode animation data. The animation data, or frames, may be encoded into a sequence of Intra frames and Predictive frames. An Intra frame establishes quantization parameters used for subsequent Predictive frames. To establish the quantization parameters, a range of data parameters, and a distortion level, may be received, from a user. The quantization parameters are set corresponding to the range and distortion level in a first Intra frame. The quantization parameters are used in subsequent Predictive frames until the data parameters are out of the range. When the data parameters are out of range another Intra frame is sent to establish new quantization parameters. In addition, the range of data parameters and distortion level being received may also be preset values, or calculated in response to the type of parameter being represented.Procesing FIG. 2 is a block diagram illustrating conversion of a text-based language, such as VRML, into a binary format, such as BIFS. FIG. 2 defines a simple scene listing 202 of a VRML file. The scene listing 202 is a 2×2×2 box (i.e., a two-unit-square box) centered at x, y, z coordinates (0, 1, 0). The box shape is set by the "geometry Box" VRML command, and To dimensions of the box are set to 2×2×2 by the "size" VRML command both in line 5. The location of the box is set by the "translation" VRML command in line 2 to (0, 1, 0). FIG. 2 shows a corresponding BIFS representation 220 of the scene listing 202.

The BIFS representation 220 of the scene 202 includes a header 222. The header may include global, and other, information about the encoding of the scene. Following the header 222 is a binary value 224 representing the Transform node. Next is a binary value data field 226 representing the translation command in line 2. Following the binary value data field 226 is a binary encoding field 228 of the three translation values. As discussed further below, the default encoding of a translation value utilizes thirty-two bits for each translation dimension. Therefore, the binary encoding field 228 of the three translation values (0, 1, 0) will occupy a data field that is ninety-six (96)-bits in length. As explained below, the number of bits used to represent certain values in BIFS may be controlled by using Quantization Parameters.

Following the binary encoding field 228 are a series of binary fields: an index of the children field of the Transform node 230; a binary value of the Shape node 232; a bit specifying how the fields of the Shape node will be listed 234, which is sequentially in this example rather than by index/value pairs; a binary value representing the Box 236 geometry; a bit specifying the fields of the Box that will be specified by an index 238; the index of the size field 240; and a binary encoding 242 of the three values for the size VRML command. As discussed above, the default encoding for the three values in the size field will occupy ninety-six (96) bits. Finally, there is a bit 244 terminating the list of fields for the Transform node.

Scene Description Encoding

As discussed above, converting textual description language files (such as VRML) to binary files generally leads to a more compact representation of the data, and a correspondingly smaller data file. The format and reproduction quality of the binary files may impose some constraints that affect the efficiency of the conversion process. In addition, to obtain a better compression ratio, the encoding may require iterative techniques to estimate the best set of conversion parameters for the particular file being converted.

Data compression may be enhanced by adjusting the number of bits used to represent a data parameter. For example, in BIFS, the number of bits used to represent a data parameter may be adjusted through the use of quantization parameters. Reducing the number of bits used to represent a data parameter will reduce the file size. While it is desirable to decrease the file size, a reduction in the number of bits used to represent a data parameter generally leads to an increase in the amount of distortion in the reproduced scene. There may be increased distortion because a value represented by a fewer number of bits cannot assume as many values as a value represented by a larger number of bits, so that a coarser, more distorted, reproduction of the data parameter is generally obtained with fewer bits in the scene representation data. Therefore, any reduction in file size should be balanced with the amount of distortion that is considered acceptable.

In BIFS data parameters represented by fourteen (14) different types of fields can be quantized, or represented, by a selectable number of bits. Table 2 below lists the types of BIFS fields that may have their quantization level adjusted, along with their value types.

TABLE 2

Type of field for each of the 14 BIFS-Command quantizer parameters.

| Quantizer | Type of value | Type of field |
| --- | --- | --- |
| 1 | Positions 3D | SFVec3f |
| 2 | Positions 2D | SFVec2f |
| 3 | Drawing order | SFInt32 |
| 4 | Color | SFFloat/SFColor |
| 5 | Texture coordinates | SFVec2f |
| 6 | Angle | SFFloat |
| 7 | Scale | SFFloat/SFVec2f/SFVec3f |
| 8 | Interpolator keys | SFFloat |
| 9 | Normals | SFVec3f |
| 10 | Rotations | SFRotation |
| 11 | Size 3D | SFFloat/SFVec2f/SFVec3f |
| 12 | Size 2D | SFFloat/SFVec2f/SFVec3f |
| 13 | Integers | SFInt32 |
| 14 | Integers, coordIndex | MFInt32 for coordIndex fields only |

Use of these Quantizers can lead to a significant reduction in the size of a BIFS file. Referring again to FIG. 2, in this example there are two types of values where quantizers may be used. The translation command 208 is a Positions 3D type of value represented by "SFVec3f" (Single Field type, Vector, 3 fields) fields, and the size command 206 is a Size 3D type of value represented by SFVec3f. In the example shown in FIG. 2, if the translation command 208 and size command 206 can be adequately represented by less than thirty-two bits for each individual value, then the overall size of the BIFS file 220 can be reduced. For example, if the translation command can be adequately represented by twelve bits for each of the three translation values, then the binary encoding 228 can be reduced from ninety-six (96) bits to thirty-six (36) bits. Likewise, if the size command can be adequately represented by eight bits for each of the three size values, then the binary encoding 242 can be reduced from ninety-six (96) bits to twenty-four (24) bits without degrading the scene representation.

Encoding scene descriptions may place some additional constraints on the format of the text file. For example, in accordance with BIFS, to convert a VRML representation into a BIFS file, the VRML file: (1) must have only one top parent, or grouping node; (2) all definitions (DEF) of nodes, or parameters, need to be converted to unique integer identifiers; and (3) all routes, used to pass values between nodes, need to be located at the end of the scene description.

Figure 3:
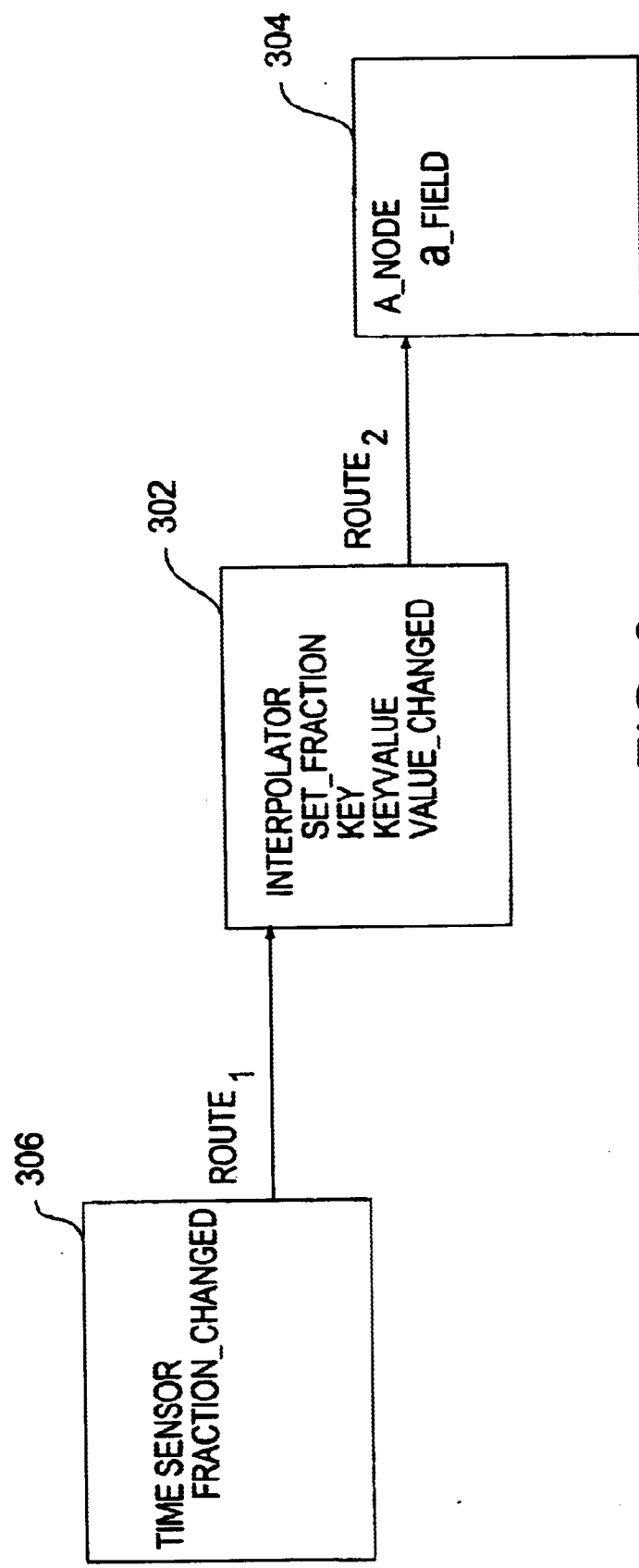
FIG. 3 is a representation of an animation scene description in VRML.

A typical scene may include both static, or command, descriptions as well as animation descriptions. An animation scene describes a node with values that change over time. FIG. 3 is an exemplary representation of an animation scene in VRML for "A_Node." In the example shown in FIG. 3 there is an interpolator 302. The interpolator 302 includes key values, which represent the range over which a value changes over time. The interpolator 302 also includes a "set_fraction" parameter that receives a timing parameter used by the interpolator to determine when to change the value, and a "value changed" parameter that assumes the new value and outputs it to a desired node 304. The sample animation scene also includes a TimeSensor 306. The TimeSensor 306 generates the timing parameter that is sent to the interpolator 302 by means of a ROUTE1 command.

Figure 4:
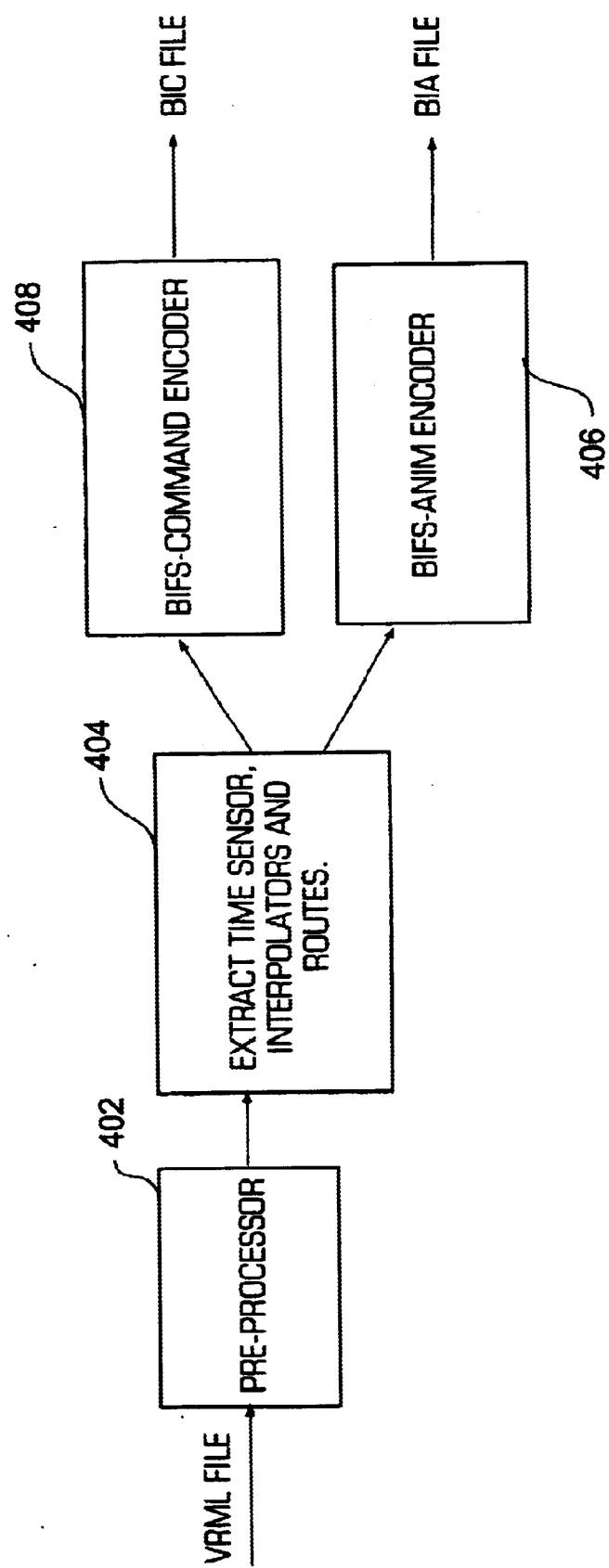
FIG. 4 is a block diagram illustrating the conversion of a VRML file into a BIFS file.

Converting VRML command and animation scenes into BIFS files is performed by BIFS encoders. FIG. 4 is a block diagram that illustrates the conversion of a VRML file into a BIFS file. A VRML file is accepted by a preprocessor 402. The preprocessor examines the VRML file and modifies or reformats the file, if necessary, so that the VRML file complies with BIFS constraints. For example, the preprocessor may ensure that the scene begins with a single top node. If the scene does not have a single top node, then the preprocessor 402 may add a top node, making all the other nodes children to the added top node. In addition, the preprocessor may convert all DEF names to unique integer values, as well as rearrange the VRML file to place all Routes at the end of the scene description.

The reformatted VRML file is then passed to an animation extractor 404. The animation extractor 404 extracts TimeSensors, Interpolators and Routes from the reformatted VRML file. The extracted, or animation, file is passed to a BIFS-Anim encoder 406, and the remaining command file is passed to a BIFS-Command encoder 408. During both the BIFS-Anim encoding and the BIFS-Command encoding, quantization parameter nodes may be added as described below. In addition, the BIFS-Command encoding may include adding BIFS commands to the encoded BIFS file, as further described below.

BIFS-Command Encoding

Figure 5:
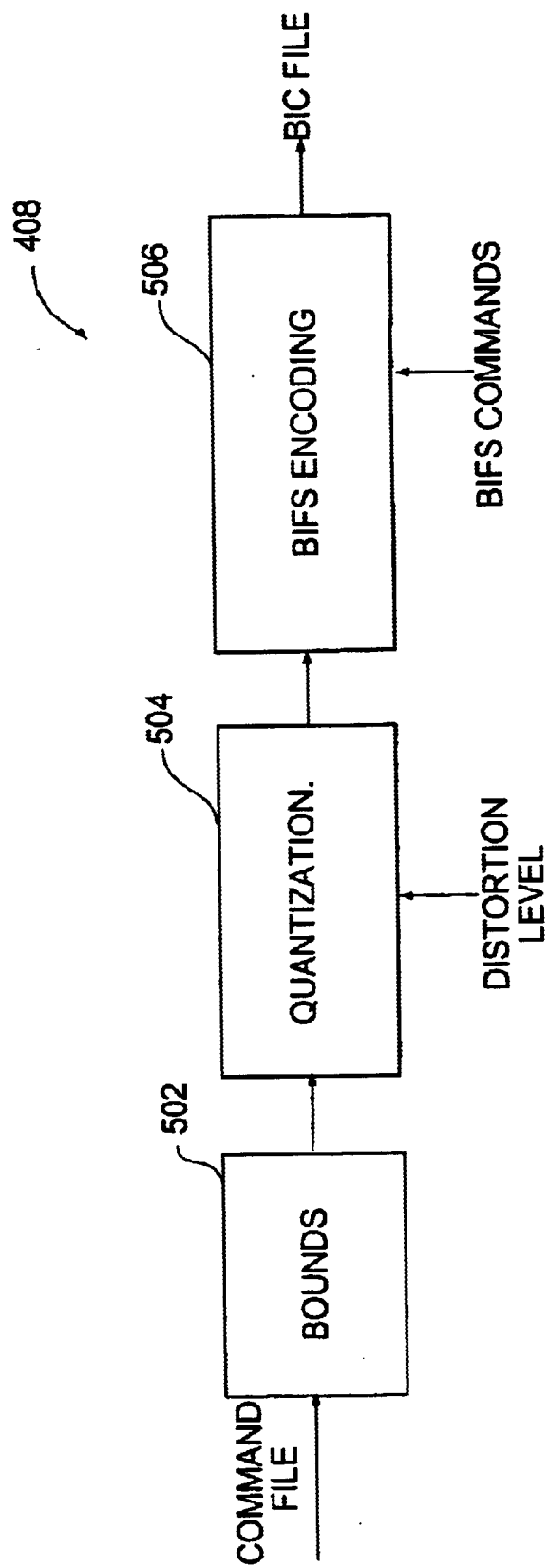
FIG. 5 is a block diagram of the BIFS-Command encoder.

FIG. 5 is a block diagram showing further detail of the BIFS-Command encoder 408. The command file from the animation extractor 404 is accepted by a bounds determiner 502. In one embodiment, the bounds determiner 502 parses the command nodes in the VRML file to determine a range of values that may be assumed by the data parameters. The bounds determiner 502 determines a range for each of the data parameters that can have their quantization level adjusted. In another embodiment, the bounds determiner 502 may receive predetermined ranges for the data parameters.

After the ranges for the various data parameters have been determined, the command file and the associated ranges for the data parameters are passed to a quantization processor 504. The quantization processor 504 also receives a distortion level. The distortion level is an indication of the amount of inaccuracy that is acceptable in the reproduction of the scene. For example, a higher distortion level may produce a less accurate scene reproduction, but the scene information may be stored in a smaller file. Likewise, a lower distortion level produces a more accurate reproduction of the scene but results in a correspondingly larger file.

As discussed further below, the quantization processor 504 determines if it is beneficial to add quantization parameters to the command file, or to add a new node with quantization parameters. The quantization processor 504 modifies the command file, if desired, and outputs a modified command file to a BIFS encoding engine 506. The BIFS encoding engine 506 accepts the text-based, modified command file from the quantization processor 504 and converts it to a binary BIFS file. Prior to the conversion to binary format, the binary encoding engine may add BIFS commands to the file. Desired commands are received from a user and added to the BIFS-Command (BIFC) file. Returning to the quantization processor 504, the range of values for the data parameters, determined in the bounds determiner 502, and the distortion level are used to calculate a quantization level for parameters in the command file. In one embodiment, the quantization levels are set manually after estimating what the resulting error would be on the values that the quantizers will act. In another embodiment, the quantization levels are set automatically, with the quantization processor 504 determining values with regard to constraints imposed, such as, the distortion, or error, level or the maximum number of bits desired for each value, or for the whole file (the data rate).

Rate distortion theory is concerned with the trade-off between a distortion and a rate in lossy compression schemes. Rate distortion theory is described in Fundamentals of Digital Image Processing by A. K. Jain, and Introduction to Data Compression by Kahlid Sayood, both of which are incorporated herein in their entirety.

The rate R can be defined as the average number of bits used to represent a sample value. Distortion (D) may be defined as the distance (d) between an original value (v) and the corresponding reconstructed value ($\hat{v}$):

$$D = d(v, \hat{v}) = \|v - \hat{v}\|$$

The distance d(.,.) may be defined as the absolute value of the difference, the squared value of the difference, or in general the distortion, D, may be defined as:

$$D = \sum_{i=0}^{M-1} \sum_{j=0}^{M'-1} d(v_i, \hat{v}_j) P(v_i) P(\hat{v}_j \mid v_i)$$

where $P(v_i)$ is the probability of occurrence of value $v_i$, $P(\hat{v}_j | v_i)$ is the conditional probability, i.e., the probability of occurrence of $\hat{v}_j$ if $v_i$ is known, and M is the number of sample values.

A rate distortion function R(D) may be defined that specifies the lowest rate at which the output of a source can be encoded while keeping the distortion less than, or equal to, the distortion D. For a given distortion level, or constraint, D*, it is possible to evaluate encoders with a distortion less than, or equal to, D* and select a desired encoder, for example, the encoder with the lowest output entropy. The entropy would be the rate corresponding to the distortion D*.

The entropy may be defined as a measure of the average number of binary symbols needed to code the output of a source. It has been showed that the best a compression scheme can do is to encode the output of a source with an average of bits equal to the entropy. See A Mathematical Theory of Communication by C. E. Shannon incorporated in its entirety herein. The entropy (H) for an independent, identically distributed (iid) random variable that takes values from a source alphabet $\chi = \{x_0, x_1, \ldots, x_{M-1}\}$ may be defined as:

$$H(X) = -\sum_{i=0}^{M-1} P(x_i) \log_2 P(x_i)$$

where $P(x_i)$ is probability of occurrence of symbol $x_i$.

In one embodiment, the source alphabet is the output of a quantizer. If the quantizer has $2^N$ steps, then the source alphabet has $M = 2^N$ values. Using a distortion defined as the difference between the original value and the reconstructed one: $D = \|v - \hat{v}\|$, two possible options are: (1) given a maximal distortion, determine a list of quantization parameters, and a desired location in the scene description, to minimize the rate; or (2) given a maximal rate, determine a list of quantization parameters, and a desired location in the scene description, to minimize distortion.

A rate distortion function C(R, D, Q) may be defined, where R is the rate, D is the distortion, and Q is the cost of adding quantization parameters (with its fields and values) in the scene description. In one embodiment, it is desired to minimize the cost function. In addition, some local constraints may be added such as rate and distortion for a node and its children, resulting in a local quantization parameter being placed before this node.

To illustrate determining the quantization parameters a simple example will be used. In this example, there is a scene description that includes a grouping node with some children nodes. The quantization parameters of each quantizers are first determined for each node. In one embodiment, the following steps are followed:

(1) D*, the maximal distortion allowed by the user, is received;

(2) $v_{min_{q,k}}$ and $V_{max_{q,k}}$, the bounds of node k for quantizer q are determined.

Determining the bounds may be done by parsing each field, of a node, to which the quantizers q applies;

(3) A number of bits, for each node, $$N_{0,k} = \log_2\left(1 + \frac{v_{max\ q,k} - v_{min\ q,k}}{2 \cdot D^*}\right)$$

are calculated, by the quantization processor 504. This represents the minimal number of bits to achieve the distortion specified by the user, for node k;

(4) From the bounds for all the nodes, the global bounds are calculated as $$v_{min\ q} = \min_k v_{min\ q,k}$$

$$v_{max\ q} = \min_k v_{max\ q,k}$$

and (5) A global minimal number of bits to achieve the user's maximal distortion, D*, is calculated $$N_0 = \log_2\left(1 + \frac{v_{max\ q} - v_{min\ q}}{2 \cdot D^*}\right)$$

Following the calculation of the number of bits required for each node and the global number of bits, it is determined if $N_0 \geq N_{0,k}$ for all nodes k. If $N_0 \geq N_{0,k}$ is true for all nodes, then the user's distortion, D*, can be achieved for all nodes by using the parameters in a global "QuantizationParameter" node as the first child of the grouping node.

However, if there exists a node k such that $N_0 \geq N_{0,k}$, then a global QuantizationParameter node will not achieve the user's desired distortion. Therefore, a local QuantizationParameter node needs to be inserted before node k.

If the user selects a distortion that cannot be achieved, then the number of bits may be set to a predetermined value. In one embodiment, the maximum number of bits is limited to $N_{0,k} \leq 32$ bits, corresponding to the maximum size of an integer that can be stored in the bitstream of a VRML file. In another embodiment based on VRML, use of a command useEfficientFloats=True may be used in the global quantizer. In this embodiment, it might cost less to use efficient float coding instead of quantization.

As discussed above, there is a cost associated with inserting a QuantizationParameter node. The cost of adding a QuantizationParameter node is specified by the fact that the QuantizationParameter node has to be encoded along with the other nodes in the scene description, resulting in a larger file size. Because it is desirable to minimize file size, typically a QuantizationParameter node is only inserted if the increased cost of encoding the QuantizationParameter node is offset by a correspondingly larger decrease in the number of bits representing the data parameters affected by the inserted quantization parameters.

In one embodiment, based on VRML and BIFS, the cost, Q, of inserting a QuantizationParameter node is summarized in Table 3.

TABLE 3

Cost associated with inserting a Quantization Parameter node.

| | |
|---|---|
| Cost of adding a SFNode | 9 |
| Cost of describing F fields: | |
| If ListNodeDescription | $1 + 7.F + C_F$ |
| If MaskNodeDescription | $40 + C_F$ |
| endFlag, if grouping node's children field uses ListNodeDescription | 1 |

In Table 3, $C_F$ is the cost of the used fields themselves. Examination of Table 3 shows that typically, if more than five (5) fields among the forty (40) fields of a QuantizationParameter node are used, then it is advantageous to use the Mask-NodeDescription when converting from VRML to BIFS rather than using the ListNodeDescription.

However, VRML provides for using DEF to define nodes. Therefore, if a defined QuantizationParameter can used, the cost would be 1+nodeIDbits (+1). Where nodeIDbits is the number of bits used to represent the nodeID of a DEF'd node, and depends on the number of DEF'd nodes in the scene, and (+1) if ListNodeDescription is used for the grouping node's children field.

The technique described above can result in a significant reduction in the size of a file representing a scene description. For example, in the VRML specification, every non-quantized field uses thirty-two (32) bits to represent each component. Therefore, SFFloat (Single Field type, Floating point) and SFInt32 (Single Field type, Integer, 32 bit) fields have one component, requiring thirty-two (32) bits each. A SFVec2f 2 (Single Field type, Vector, 2 fields) field has two components, requiring sixty-four (64) bits. A SFVec3f and SFColor (Single Field type, Color) field have three components each, requiring ninety-six (96) bits. A SFRotation (Single Field type, Rotation) field has four components, requiring one hundred twenty-eight (128) bits. In contrast, using a quantizer q requires only $N_{0_q}$ bits per component for a field. Therefore, if efficient float representation is used, the number of bits may vary per component between four (4) and twenty-nine (29) bits. It should also be noted that quantization of normals and rotations use one less component, i.e. two for normals and three for rotations, when using efficient float. As a result of using QuantizationParameter nodes, and depending on the number of fields to which quantization is applied, the size of a file representing a scene description may be reduced.

The technique described above, in relation to a simple scene, can be extended to a more complex, complete, scene. The complete scene may be made of a top grouping node, which may contain other grouping nodes as illustrated in FIG. 1.

As discussed above, parameters set at a parent node may affect the children nodes. If a QuantizationParameter node is a global type of node, it applies quantizers to all siblings nodes and their children. For example, if a global type of QuantizationParameter node is inserted in grouping node 106, the quantizers will apply to children nodes 110, 112, 114 and 116 following the grouping node. However, if a QuantizationParameter node is a local type of node, it applies to only the node immediately following the QuantizationParameter node. For example, if a local type of QuantizationParameter node is inserted in grouping node 106, the quantizers are applied only to the data parameters of grouping node 106. The children to grouping node 106, nodes 110, 112, 114 and 116 will use quantizers determined as if there was no QuantizationParameter node present at grouping node 106.

In one embodiment, the above described technique is applied to a complete scene description according to the following steps, referring to FIG. 1 where a four level (L=4) tree scene description is illustrated.

(1) Begin at the highest numeric grouping level in the tree, i.e. l=L−2, (2) Apply the technique described above at this level.

(3) Step (2) may result in inserting a global QuantizationParameter node before the first node, or possibly a local QuantizationParameter before selected nodes at level l+1.

(4) Move the bounds and number of bits determined for each quantizer at the child node at l+1 to the grouping node at level l. Adding a global QuantizationParameter at level l+1 as first node of a grouping node at level l is equivalent to adding a local QuantizationParameter before the grouping node at level l.

(5) Repeat steps (2) through (4) for level l=l−1 until the root of the tree is reached, i.e. level l=0. It should be noted that, at level 0, a local QuantizationParameter node cannot be added before the grouping node. Therefore, the global QuantizationParameter node at level 1 is retained.

After the above steps have been performed, the following additional step is performed.

(6) Beginning at level l=0, proceed through the tree downward to level l=L−1, examining the QuantizationParameter at the nodes. If there are QuantizationParameter with the same field values, i.e. same quantizers at level l'>l, then replace the QuantizationParameter node at level l' with a USE QuantizationParameter command at level 1.

BIFS-Anim Encoding

Optimization of BIFS-Anim encoding differs somewhat from the BIFS-Command encoding, in part due to the structure of the encoding scheme. Quantization parameters are still used during the encoding of the BIFS-Anim file, however, due to the animation encoding, using Intra frames and Predictive frames, as described below, the encoding process is, in some ways, more straight forward.

Figure 6:
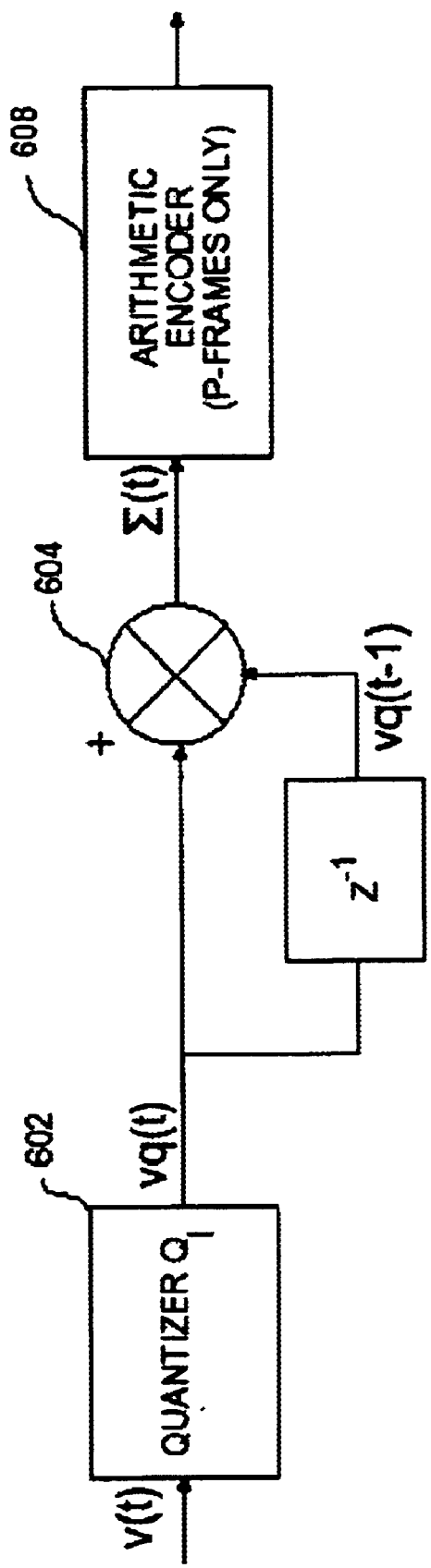
FIG. 6 is a block diagram of the BIFS-Anim encoder.

FIG. 6 is a block diagram of the BIFS-Anim encoding process. In an animation frame, at time t, a value of a field of one of an animation nodes v(t) is quantized. The value of the field is quantized using the field's animation quantizer $Q_I$ 602. The subscript I denotes that parameters of the Intra frame are used to quantize a value v(t) to a value vq(t). The output of the quantizer $Q_I$ 602 is coupled to a mixer 604 and a delay 606. The delay 606 accepts the output of the quantizer $Q_I$ 602 and delays it for one frame period. The output of the delay 606 is then connected to a second input to the mixer 604.

The mixer 604 has two inputs that accept the output of the quantizer $Q_I$ 602 and the output of the delay 606. The mixer 604 outputs the difference between the two signals present at its input represented by $\epsilon(t)=vq(t)-vq(t-1)$. In an Intra frame, the mixer 604 output is vq(t) because there is no previous value vq(t-1). The output of the mixer 604 is coupled to an arithmetic encoder 608. The arithmetic encoder 608 performs a variable length coding of $\epsilon(t)$. Adaptive Arithmetic encoding is a well-known technique described in *Arithmetic Coding for Data Compression*, by I. H. Witten, R. Neal, and J. G. Cleary, Communications of the ACM, 30:520–540, June 1997, incorporated in its entirety herein.

Parameters used by the quantizer $Q_I$ 602 include $I_{min}$, $I_{max}$, and $N_I$. $I_{min}$, and $I_{max}$ correspond to the minimal and maximal bounds of the value v(t) over all frames in the animation. $N_I$ is the number of bits used to quantize the value v(t), and corresponds to $2^{N_I}$ steps, or levels, for the quantizer.

Parameters used by the arithmetic encoder 608 include $P_{min}$ and $N_P$. $P_{min}$ corresponds to the lower bound in Predictive mode and is defined as $P_{min}=K-2^{N_I}$. It can be seen that $P_{min}$ depends only on a constant K, and the number of bits used in to quantize the value in the quantizer $Q_I$ 602. $N_P$ is used to initialize the arithmetic model for the field of value v(t) with $2^{N_P}$ values.

Similarly to the BIFS-Command encoding it is desirable to select parameters to generate a smaller bitstream with a small distortion. As discussed below, it must also be determined when to insert Intra frames in the bitstream among Predictive ones.

A typical animation file may be authored using a set of software tools. In an animation file that has been previously authored, all the values that a field may assume in the animation are known. Knowing all the values that a field may assume makes it possible to determine the bounds of the field. Knowing the bounds of a field, it is possible to calculate a maxima distortion D introduced by a quantizer using $N_I$ bits.

$$D \leq \frac{\Delta}{2}, \Delta = \frac{I_{max} - I_{min}}{2^{N_I} - 1}$$

If a desired maximum distortion D* not to exceed is selected the minimal number of bits $N^*_I$ required to satisfy the desired distortion level is defined as:

$$N^*_I = \log_2\left(1 + \frac{I_{max} - I_{min}}{2 \cdot D^*}\right)$$

If a number of bits used to quantize a field, $N_I$, is selected so that $N_I \geq N^*_I$, then the actual distortion in the animation scene D will be less than, or equal to the maximal distortion, D*, acceptable.

In Predictive mode, the difference between two consecutive values of a field vq(t) that is sent in the bitstream is determined as follows:

$$0 \leq v_q(t) < 2^{N_I}$$
$$-2^{N_I} < v_q(t) - v_q(t-1) < 2^{N_I}$$
$$0 < v_q(t) - v_q(t-1) + 2^{N_I} < 2^{N_I+1}$$

Examination of the above equation shows that in the worst case, there may be a difference of $2^{N_I+1}$. Thus, the predictive arithmetic model for the field might need $2^{N_I+1}$ values i.e. $N^*_P=N_I+1$. Thus can result in requiring an excessive amount of memory to store the values for the field. To reduce the memory requirements, values of a field may be correlated over time and the difference may be bounded to a subset of all possible values. The subset can be defined as:

$$K \leq v_q(t) - v_q(t-1) + 2^{N_I} \leq L$$

where $$L - K + 1 = 2^{N_P}$$

$$N_P = \log_2(L - K + 1)$$

For example, if on a set of animation frames K and L are known, then the number of bits, $N_P$, that should use to initialize the arithmetic model of this field can be determined. On the other hand, if the number of bits not to cross in Predictive mode is selected, then a set of frames such that $L - K + 1 \leq 2^{N_P}$ is determined. Prior to, and subsequent to, the Predictive frames Intra frames will be inserted.

To illustrate this technique, an example is described wherein the bounds, K and L, of a set of animation frames are known and the number of bits $N_P$ will be determined. Previously, it was shown that $N^*_P=N_I+1$ was the worst case. However, in some cases, it may be desirable to use $N^*_P$, even though it results in more memory being used because the entire bitstream will consist of a single Intra frame, I, followed by only Predictive frames, P.

IPP . . . P ideal case.

In general, the memory requirements for this case will be very large, making it impractical to use $N^*_P$. Therefore, a typical bitstream will consist of Intra frames, I, interspersed between Predictive frames.

IPP . . . PIP . . . PIP . . . P typical case,

The typical bitstream, with Intra frames interspersed between Predictive frames will usually result in a lower rate than the ideal case of a single Intra frame followed by only Predictive frames. Introduction of Intra frames into the bitstream generally results in a greater memory requirement than the ideal case. However, the quantization parameters used between Intra frames are changed, and therefore may lower the distortion of the entire bitstream.

The worst case may occur when the previous value is $v(t-1)=I_{min}$ and the current one is $v(t) \geq I_{max}$, or vice-versa. If this happens, it may be beneficial to insert an Intra frame before sending the current value and to find other quantization parameters for the following values.

On the other hand, it is important to reduce memory requirements. Therefore, it is generally not possible to know the capabilities of a receiving terminal. For example, if the receiving terminal is a set top box, a mobile phone, or any other low memory device, the user may not be able to play, and view, the bitstream.

The following example describes an embodiment that utilizes the techniques discussed above. In the embodiment v(t) is a value of a field of an animation frame at time t. D* is the maximum distortion not to pass as selected by a user. $N_I''$ and $N_P''$ are the number of bits not to cross as selected by the user in Intra and Predictive mode respectively.

In this embodiment the following steps are followed:

(1) Determine the quantization parameters for Intra frame $t_0$
  (a) Parse all values for frames $t \geq t_0$
  (b) Update $I_{min}$, $I_{max}$ and $N^*$ such that $$I_{min} = \min_{f=0 \ldots M-1} v(f)$$

$$I_{max} = \max_{f=0 \ldots M-1} v(f)$$

$$N^* = \log_2\left(1 + \frac{I_{max} - I_{min}}{2D^*}\right)$$

(c) Stop if $N^* > N_I''$.

At the completion of these steps M values, and possibly all values, of the frame have been parsed.

(2) Determine quantization parameters for Predictive frames
  (a) For frames $1 \leq f \leq M-1$, determine $$K = 2^{N_I} + \min_{f=1 \ldots M-1} v_q(f) - v_q(f-1)$$

$$L = 2^{N_I} + \max_{f=1 \ldots M-1} v_q(f) - v_q(f-1)$$

(b) Stop if $L > 2^{N''_P} - 1 + K$.

If this criterion has been meet at frame $M' < M$, it may not be practical to use additional predictive frames because the arithmetic model may overflow. In that situation it may be necessary to re-send an Intra frame and return to step (1).

(3) Return to step 1 and continue to process frames until all values of all frames are processed.

At the completion of this process, a complete sequence of Intra and Predictive frames meeting the criterion imposed by the user have been established.

In another embodiment, a global minimum may be determined instead of local minimum as described above. To find the global minimum, the procedure described above is followed. with various values of D*. From rate-distortion theory, it can be shown that there exists an optimal distortion D* such that $$D_{min} \leq D^* \leq D_{max}$$

The value D* minimizes the rate, i.e. the total number of bits used to send the values. To determine the value D* the following steps may be followed:

(1) Follow the steps described above, using a relatively low value $D_{min} = D_1$. Calculate a corresponding rate $R_1$.
(2) Follow the steps described above, using a relatively high value $D_{max} = D_2$. Calculate a corresponding rate $R_2$.
(3) If $R_1 < R_2$, then let $D_{min} = D_1$ and $D_{max} = (D_2 - D_1)/2$. Then follow the steps described above using the new $D_{max}$. The optimal distortion will be between $D_{min}$ and $D_{max}$.
(4) If $R_2 < R_1$, then let $D_{min} = (D_2 - D_1)/2$ and $D_{max} = D_2$. Then follow the steps described above using the new $D_{min}$. The optimal distortion will be between $D_{min}$ and $D_{max}$.
(5) Stop this procedure if $R_1 \approx R_2$.

At the conclusion of this procedure, the lowest distortion and corresponding minimal rate have been determined. In the procedure just described the user selected $N_I''$ and $N_P''$. As stated earlier, these parameters are mainly to reduce the amount of memory required. Moreover, for efficiency, it may be better to keep $N_P''$ constant for all predictive frames in the first technique. This could avoid reallocating new arrays for the arithmetic model at each Intra frame. If $N_P''$ is kept constant, it is reset at each Intra frame.

In another embodiment, piecewise interpolation is used. When converting VRML contents to BIFS-Anim, encoded values come from interpolators. In interpolators, values are linearly interpolated between two keys. In BIFS-Anim, values will also be interpolated linearly between two key frames, which are typically Intra frames. Key frames correspond to interpolator's keys. The slope of a linear segment between two keys is constant. However, $\epsilon(t) = vq(t) - vq(t-1) = v(t) - v(t-1) + q(t) - q(t-1)$ does not remain constant unless quantization noise q(t) and q(t-1) are identical, which is rarely the case in practice.

VRML interpolators last for a period of T seconds given by a TimeSensor node. In BIFS-Anim, a frame rate f is specified in frames per second. The interpolators' keyValues will be sampled at this fixed frame rate. Each frame will have duration of 1/f seconds, and T.f frames will be generated. The following example illustrates the technique assuming keys coincide with BIFS-Anim frames i.e. $key_i = k_i/f$, where $k_i$ is an integer.

(1) Between two interpolator keys $key_i$ and $key_{i+1}$,
  (a) Determine the slope:

$$s = \frac{keyValue_{i+1} - keyValue_i}{\Delta t_i} = f \cdot \frac{keyValue_{i+1} - keyValue_i}{k_{i+1} - k_i}$$

where $\Delta t_i = (k_{i+1} - k_i)/f$ is the elapsed time between the two keys.
  (b) Determine Intra quantization parameters:

$$I_{min} = \min(keyValue_i, keyValue_{i+1})$$

$$I_{max} = \max(keyValue_i, keyValue_{i+1})$$

$$N_I^* = \log_2\left(1 + \frac{I_{max} - I_{min}}{2 \cdot D^*}\right)$$

(c) Determine Predictive quantization parameters.

$$K = \lfloor \Delta q_{min} + s/f + 2^{N^*_I} \rfloor$$

$$N^*_P = 1$$

Empirically, it can be shown that $\Delta q_{min} \approx 4.825 \cdot 2^{N^*_I - 9}$ is a good estimate for this type of quantizer and data. It should be noted that this value is empirical, and works well in practice, however this value is not determined mathematically.

(2) Return to step 1, and continue the procedure until end of keys.

In another embodiment the animation scene is an interactive scenario. In an interactive scenario, knowledge of all the values of a field over time may not be possible. Therefore, for selected values of $v_{min}$, $v_{max}$, $N_I$ and K for each field's quantizer, a monitoring of the values may be needed to avoid a value falling out of range.

If a value falls out of range it may be necessary to send an Intra frame with new quantization parameters. When an Intra frame is sent, the arithmetic models are re-allocated, decreasing the performance. However, it may be difficult to estimate what values the new quantization parameters since have. One technique that may be used to determine new quantization parameters is to evaluate the previous values. By monitoring the rate of change of values, an estimate of new values can be based on the past rate of change.

System Block Diagram

Figure 7:
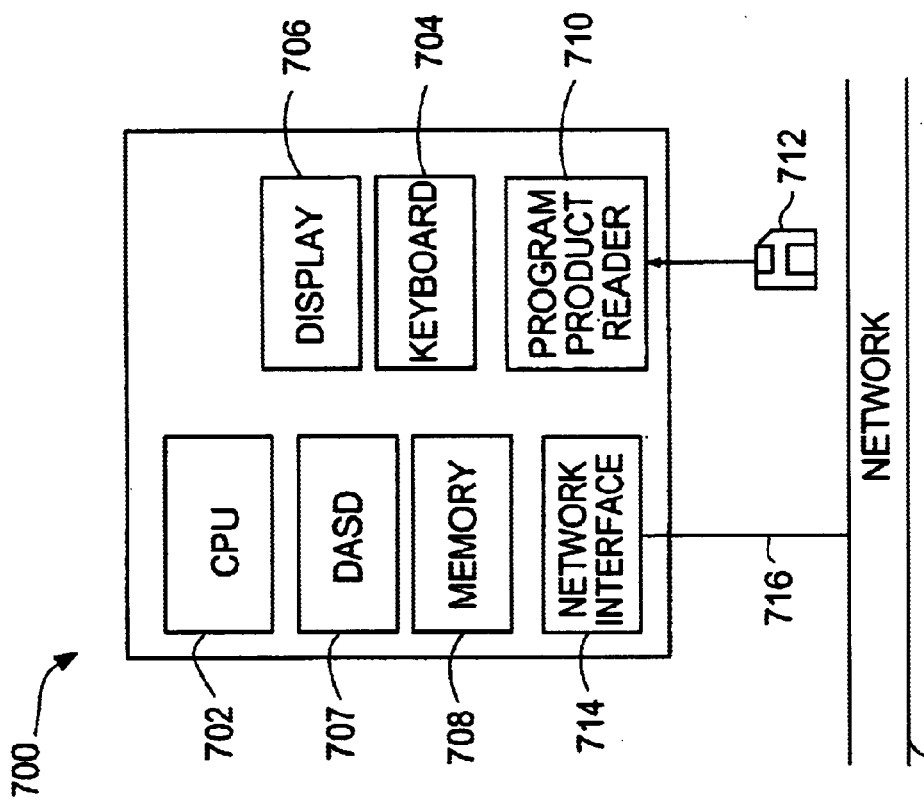
FIG. 7 is a block diagram of an exemplary computer such as can be used to implement BIFS encoding.

FIG. 7 is a block diagram of an exemplary computer 700 such as might be used to implement the BIFS encoding described above. The computer 700 operates under control of a central processor unit (CPU) 702, such as a "Pentium" microprocessor and associated integrated circuit chips, available from Intel Corporation of Santa Clara, Calif., USA. A computer user can input commands and data, such as the acceptable distortion level, from a keyboard 704 and can view inputs and computer output, such as multimedia and 3D computer graphics, at a display 706. The display is typically a video monitor or flat panel display. The computer 700 also includes a direct access storage device (DASD) 707, such as a hard disk drive. The memory 708 typically comprises volatile semiconductor random access memory (RAM) and may include read-only memory (ROM). The computer preferably includes a program product reader 710 that accepts a program product storage device 712, from which the program product reader can read data (and to which it can optionally write data). The program product reader can comprise, for example, a disk drive, and the program product storage device can comprise removable storage media such as a magnetic floppy disk, a CD-R disc, or a CD-RW disc. The computer 700 may communicate with other computers over the network 713 through a network interface 714 that enables communication over a connection 716 between the network and the computer.

The CPU 702 operates under control of programming steps that are temporarily stored in the memory 708 of the computer 700. The programming steps may include a software program, such as a program that converts a VRML file into BIFS format. Alternatively, the software program may include an applet or a Web browser plug-in. The programming steps can be received from ROM, the DASD 707, through the program product storage device 712, or through the network connection 716. The storage drive 710 can receive a program product 712, read programming steps recorded thereon, and transfer the programming steps into the memory 708 for execution by the CPU 702. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 708 over the network 713. In the network method, the computer receives data including program steps into the memory 708 through the network interface 714 after network communication has been established over the network connection 716 by well-known methods that will be understood by those skilled in the art without further explanation. The program steps are then executed by the CPU.

Figure 8:
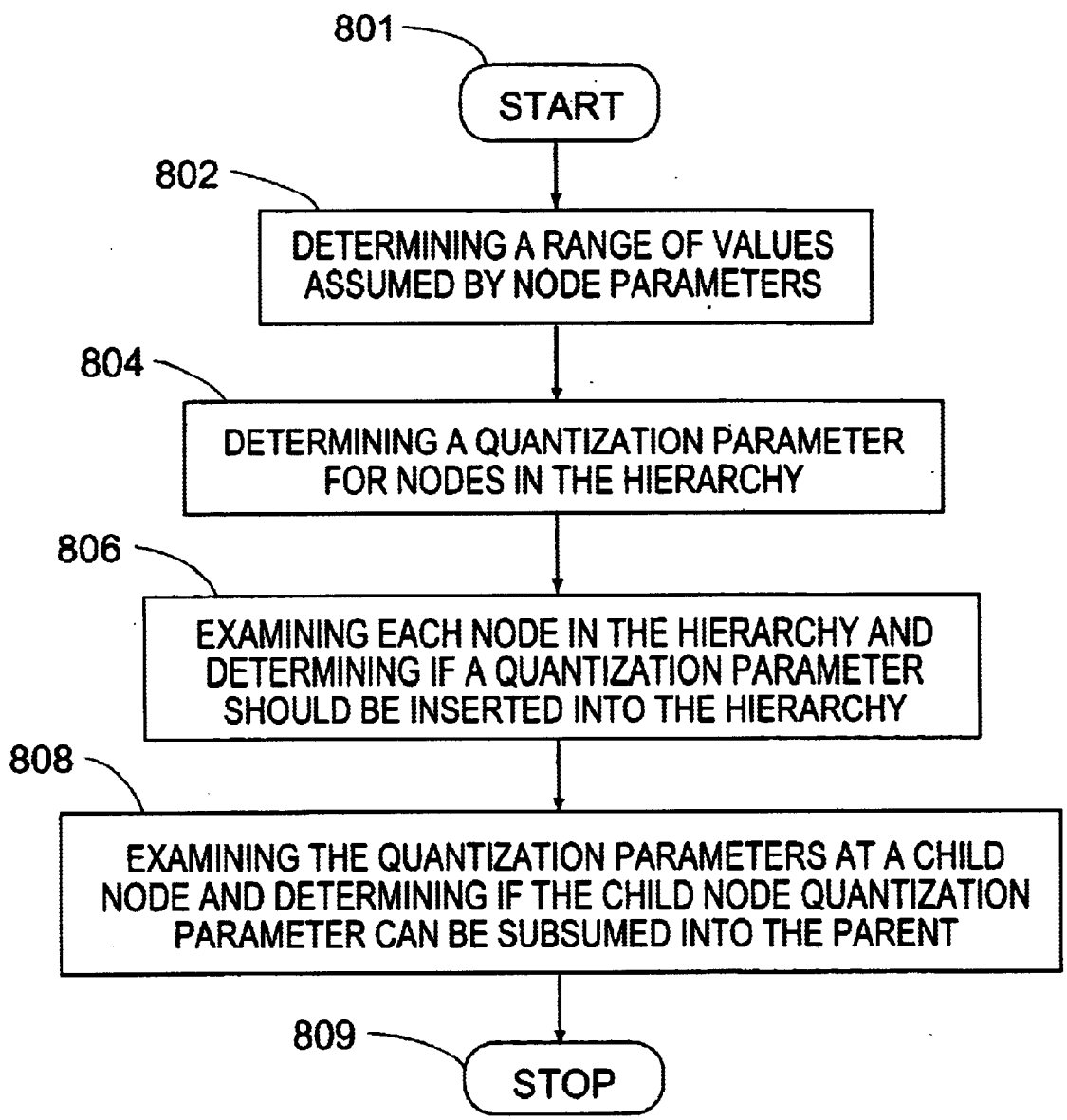
FIG. 8 is a flow diagram illustrating the insertion of quantization parameters during the conversion of a VRML file to BIFS format.

The VRML to BIFS conversion operation performed by the computer program that is loaded in the memory (shown in FIG. 7), includes the operation as illustrated in the flow diagram of FIG. 8. Flow starts in block 801. Flow then continues to block 802. In block 802, beginning at the highest numeric grouping level in the hierarchy, a range of values assumed by node parameters in the hierarchy of nodes is determined. Within the hierarchy of nodes there is a grouping node at the top of the hierarchy that is followed by one or more child nodes. The nodes in the hierarchy are specified by the data file. Flow then continues to block 804 where a quantization parameter that indicates a desired number of bits with which to represent the value range of one or more of the node parameters for the nodes in the hierarchy is determined. In block 806 each node in the hierarchy is examined, and it is determined if a change in quantization parameter for a node is desirable. If so, then a quantization parameter value with the desired change is determined, and inserted into the hierarchy at the node. This operation produces a quantized hierarchy. The operations described in blocks 802 through 806 are repeated, advancing upward in the node hierarchy, from the greatest numeric level to lesser numeric grouping levels in the hierarchy until the grouping node at the top of the hierarchy, the root of the tree, is reached.

Flow then continues to block 808. In block 808, beginning at the top grouping node, the quantization parameter at each node of the quantized hierarchy is examined to determine if one or more quantization parameters at a child node of the node being examined can be subsumed under the examined node quantization parameter. If so, then the child node quantization parameter is deleted from the quantized hierarchy. The operations described in block 808 are repeated, level by level, advancing from the grouping node through higher numeric grouping levels in the hierarchy until the lowest level grouping level of the hierarchy is reached. Flow stops in block 809.

The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. A method of processing a data file, the method comprising:

determining a range of values assumed by node parameters in a hierarchy of nodes wherein a grouping node at the top of the hierarchy is followed by one or more child nodes, wherein the nodes are specified by the data file;

determining a quantization parameter that indicates a desired number of bits with which to represent the value range of one or more of the node parameters for the nodes in the hierarchy;

examining each node in the hierarchy and determining if a change in quantization parameter for a node is desirable and, if so, determining a quantization parameter value with the desired change and inserting it into the hierarchy at the node, thereby producing a quantized hierarchy;

examining the quantization parameter at each node of the quantized hierarchy and determining if one or more quantization parameters at a child node of the node being examined can be subsumed under the examined node quantization parameter and, if so, deleting the child node quantization parameter from the quantized hierarchy; and wherein the quantization parameters are used to determine the number of bits used to represent data parameters during data compression.

2. A method as defined in claim 1, wherein determining a quantization parameter further comprises:
   receiving a value indicating an acceptable distortion level of a process that receives the data file and produces a corresponding presentation of the data file; and
   calculating the quantization parameter in response to the range of values and the value indicating an acceptable distortion level.

3. A method as defined in claim 2, wherein the value indicating an acceptable distortion level is received from a user.

4. A method as defined in claim 2, wherein the value indicating an acceptable distortion level is a predetermined value.

5. A method as defined in claim 2, wherein the value indicating an acceptable distortion level is calculated in response to the node parameter being represented.

6. A method as defined in claim 1, wherein determining a quantization parameter further comprises:
   receiving a value indicating an acceptable data rate of a process that receives the data file and produces a corresponding presentation of the data file; and
   calculating the quantization parameters in response to the range of values and the value indicating an acceptable data rate.

7. A method as defined in claim 6, wherein the value indicating an acceptable data rate is received from a user.

8. A method as defined in claim 6, wherein the value indicating an acceptable data rate is a predetermined value.

9. A method as defined in claim 6, wherein the value indicating an acceptable rate is calculated in response to the node parameter being reresented.

10. A method as defined in claim 1, wherein determining a quantization parameter further comprises:
    receiving a value indicating either an acceptable distortion level or an acceptable data rate of a process that receives the data file and produces a corresponding presentation of the data file; and
    calculating the quantization parameters so as to minimize the distortion level or the data rate of the process, whichever was not received.

11. A method as defined in claim 10, wherein the value indicating either an acceptable distortion level or an acceptable data rate is receive from a user.

12. A method as defined in claim 10, wherein the value indicating either an acceptable distortion level or an acceptable data rate is a predetermined value.

13. A method as defined in claim 10, wherein the value indicating either an acceptable distortion level or an acceptable data rate is calculated in response to the node parameter being represented.

14. A method as defined in claim 1, wherein calculating a quantization parameter further comprises:
    receiving a value indicating an acceptable distortion level, and a value indicating an acceptable data rate, of a process that receives the data file and produces a corresponding presentation of the data file; and
    calculating the quantization parameters so as to minimize the distortion level without exceeding the acceptable data rate of the process.

15. A method as defined in claim 1, wherein calculating a quantization parameter further comprises:
    receiving a value indicating an acceptable distortion level, and a value indicating an acceptable data rate, of a process that receives the data file and produces a corresponding presentation of the data file; and
    calculating the quantization parameters so as to minimize the data rate without exceeding the acceptable distortion level of the process.

16. A method as defined in claim 1, wherein a quantization parameter is determined and inserted into the node hierarchy if a cost associated with inserting the quantization parameter is less than a cost of not inserting the quantization parameter.

17. A method as defined in claim 1, wherein determining if one or more quantization parameters at a child node can be subsumed under the examined node quantization parameter comprises:
    examining the value of the quantization parameters at the child node;
    comparing the value of the quantization parameters at the child node to the value of the quantization parameters at the examined node; and
    subsuming the child quantization parameters into the examined node quantization parameters if a cost associated with inserting a quantization parameter is lower for the combined quantization parameters at the examined node than for the individual quantization parameters at the individual child nodes.

18. A system for compression of a text-based language representation to a binary representation, the system comprising:
    a memory in which instructions and data are stored; and
    a processor, coupled to the memory, such that the processor receives the instructions stored in the memory and executes the instructions to perform operations comprising:
      preprocessing a text-based file, and modifying the file to meet desired constraints and to output a formatted text based file;
      examining the formatted text-based file to determine a range corresponding to each data parameter at each node;
      receiving a performance parameter and calculating a quantization parameter that corresponds to a number of bits used to represent each data parameter in response to the data parameter range and the performance parameter wherein the performance parameter is a value indicating an acceptable distortion level;
      adding one or more quantization parameters at each node, wherein the quantization list is made up of the calculated quantization parameters for each node, and outputting a modified text file;
      examining the quantization list of each child node of a grouping node and determining if a more efficient data compression may be performed by combining quantization lists at the grouping node and outputting a quantization parameter consolidated text file; and
      using the quantization lists to generate a binary file with the number of bits used to represent each data parameter being determined by its corresponding quantization parameter.

19. A system for compression of a text-based language representation to a binary representation, the system comprising:
    a memory in which instructions and data are stored; and
    a processor, coupled to the memory, such that the processor receives the instructions stored in the memory and executes the instructions to perform operations comprising:

preprocessing a text-based file, and modifying the file to meet desired constraints and to output a formatted text based file;

examining the formatted text-based file to determine a range corresponding to each data parameter at each node;

receiving a performance parameter and calculating a quantization parameter that corresponds to a number of bits used to represent each data parameter in response to the data parameter range and the performance parameter wherein the performance parameter is a value indicating an acceptable data rate;

adding one or more quantization parameters at each node, wherein the quantization list is made up of the calculated quantization parameters for each node, and outputting a modified text file;

examining the quantization list of each child node of a grouping node and determining if a more efficient data compression may be performed by combining quantization lists at the grouping node and outputting a quantization parameter consolidated text file; and using the quantization lists to generate a binary file with the number of bits used to represent each data parameter being determined by its corresponding quantization parameter.

20. A system for compression of a text-based language representation to a binary representation, the system comprising:

a memory in which instructions and data are stored; and a processor, coupled to the memory, such that the processor receives the instructions stored in the memory and executes the instructions to perform operations comprising:

preprocessing a text-based file, and modifying the file to meet desired constraints and to output a formatted text based file;

examining the formatted text-based file to determine a range corresponding to each data parameter at each node;

receiving a performance parameter and calculating a quantization parameter that corresponds to a number of bits used to represent each data parameter in response to the data parameter range and the performance parameter wherein the performance parameter is a value indicating either an acceptable distortion level or an acceptable data rate, and the quantization parameter is calculated so as to minimize the distortion level or of the data rate; whichever was not received;

adding one or more quantization parameters at each node, wherein the quantization list is made up of the calculated quantization parameters for each node, and outputting a modified text file;

examining the quantization list of each child node of a grouping node and determining if a more efficient data compression may be performed by combining quantization lists at the grouping node and outputting a quantization parameter consolidated text file; and using the quantization lists to generate a binary file with the number of bits used to represent each data parameter being determined by its corresponding quantization parameter.

21. A system as defined in claim 18, wherein the performance parameter is a value indicating an acceptable distortion level and an acceptable data rate, and the quantization parameter is calculated so as to minimize the distortion level without exceeding the acceptable data rate.

22. A system as defined in claim 18, wherein the performance parameter is a value indicating an acceptable distortion level and an acceptable data rate, and the quantization parameter is calculated so as to minimize the data rate without exceeding the acceptable distortion level.

23. A system for compression of a text-based language representation to a binary representation, the system comprising:

a memory in which instructions and data are stored; and a processor, coupled to the memory, such that the processor receives the instructions stored in the memory and executes the instructions to perform operations comprising:

preprocessing a text-based file, wherein the text-based file is a VRML-based file, and modifying the file to meet desired constraints and to output a formatted text based file;

examining the formatted text-based file to determine a range corresponding to each data parameter at each node;

receiving a performance parameter and calculating a quantization parameter that corresponds to a number of bits used to represent each data parameter in response to the data parameter range and the performance parameter;

adding one or more quantization parameters at each node, wherein the quantization list is made up of the calculated quantization parameters for each node, and outputting a modified text file;

examining the quantization list of each child node of a grouping node and determining if a more efficient data compression may be performed by combining quantization lists at the grouping node and outputting a quantization parameter consolidated text file; and using the quantization lists to generate a binary file with the number of bits used to represent each data parameter being determined by its corresponding quantization parameter.

24. A system for compression of a text-based language representation to a binary representation, the system comprising:

a memory in which instructions and data are stored; and a processor, coupled to the memory, such that the processor receives the instructions stored in the memory and executes the instructions to perform operations comprising:

preprocessing a text-based file, wherein the text-based file is a XML-based file, and modifying the file to meet desired constraints and to output a formatted text based file;

examining the formatted text-based file to determine a range corresponding to each data parameter at each node;

receiving a performance parameter and calculating a quantization parameter that corresponds to a number of bits used to represent each data parameter in response to the data parameter range and the performance parameter;

adding one or more quantization parameters at each node, wherein the quantization list is made up of the calculated quantization parameters for each node, and outputting a modified text file;

examining the quantization list of each child node of a grouping node and determining if a more efficient data compression may be performed by combining quantization lists at the grouping node and outputting a quantization parameter consolidated text file; and using the quantization lists to generate a binary file with the number of bits used to represent each data parameter being determined by its corresponding quantization parameter.

25. A system for compression of a text-based language representation to a binary representation, the system comprising:

a memory in which instructions and data are stored; and a processor, coupled to the memory, such that the processor receives the instructions stored in the memory and executes the instructions to perform operations comprising:

preprocessing a text-based file, and modifying the file to meet desired constraints and to output a formatted text based file, wherein said modifying step further comprising adding BIFS commands;

examining the formatted text-based file to determine a range corresponding to each data parameter at each node;

receiving a performance parameter and calculating a quantization parameter that corresponds to a number of bits used to represent each data parameter in response to the data parameter range and the performance parameter;

adding one or more quantization parameters at each node, wherein the quantization list is made up of the calculated quantization parameters for each node, and outputting a modified text file;

examining the quantization list of each child node of a grouping node and determining if a more efficient data compression may be performed by combining quantization lists at the grouping node and outputting a quantization parameter consolidated text file; and using the quantization lists to generate a binary file with the number of bits used to represent each data parameter being determined by its corresponding quantization parameter.

26. A system for compression of a text-based language representation to a binary representation, the system comprising;

a memory in which instructions and data are stored; and a processor, coupled to the memory, such that the processor receives the instructions stored in the memory and executes the instructions to perform operations comprising:

preprocessing a text-based file, and modifying the file to meet desired constraints and to output a formatted text based file;

examining the formatted text-based file to determine a range corresponding to each data parameter at each node;

receiving a performance parameter and calculating a quantization parameter that corresponds to a number of bits used to represent each data parameter in response to the data parameter range and the performance parameter;

adding one or more quantization parameters at each node, wherein the quantization list is made up of the calculated quantization parameters for each node, and outputting a modified text file;

examining the quantization list of each child node of a grouping node and determining if a more efficient data compression may be performed by combining quantization lists at the grouping node and outputting a quantization parameter consolidated text file; and using the quantization lists to generate a binary file, wherein the binary file is a BIFS file, with the number of bits used to represent each data parameter being determined by its corresponding quantization parameter.

27. A system for compression of a text-based language representation to a binary representation, the system comprising:

a memory in which instructions and data are stored; and a processor, coupled to the memory, such that the processor receives the instructions stored in the memory and executes the instructions to perform operations comprising:

preprocessing a text-based file, and modifying the file to meet desired constraints and to output a formatted text based file;

examining the formatted text-based file to determine a range corresponding to each data parameter at each node;

receiving a performance parameter and calculating a quantization parameter that corresponds to a number of bits used to represent each data parameter in response to the data parameter range and the performance parameter, wherein the performance parameter is received from a user;

adding one or more quantization parameters at each node, wherein the quantization list is made up of the calculated quantization parameters for each node, and outputting a modified text file;

examining the quantization list of each child node of a grouping node and determining if a more efficient data compression may be performed by combining quantization lists at the grouping node and outputting a quantization parameter consolidated text file; and using the quantization lists to generate a binary file with the number of bits used to represent each data parameter being determined by its corresponding quantization parameter.

28. A system for compression of a text-based language representation to a binary representation, the system comprising:

a memory in which instructions and data are stored; and a processor, coupled to the memory, such that the processor receives the instructions stored in the memory and executes the instructions to perform operations comprising:

preprocessing a text-based file, and modifying the file to meet desired constraints and to output a formatted text based file;

examining the formatted text-based file to determine a range corresponding to each data parameter at each node;

receiving a performance parameter and calculating a quantization parameter that corresponds to a number of bits used to represent each data parameter in response to the data parameter range and the performance parameter, wherein the performance parameter is a predetermined value;

adding one or more quantization parameters at each node, wherein the quantization list is made up of the calculated quantization parameters for each node, and outputting a modified text file;

examining the quantization list of each child node of a grouping node and determining if a more efficient data compression may be performed by combining quantization lists at the grouping node and outputting a quantization parameter consolidated text file; and using the quantization lists to generate a binary file with the number of bits used to represent each data parameter being determined by its corresponding quantization parameter.

29. A system for compression of a text-based language representation to a binary representation, the system comprising:

a memory in which instructions and data are stored; and a processor, coupled to the memory, such that the processor receives the instructions stored in the memory and executes the instructions to perform operations comprising:

preprocessing a text-based file, and modifying the file to meet desired constraints and to output a formatted text based file;

examining the formatted text-based file to determine a range corresponding to each data parameter at each node;

receiving a performance parameter, wherein the performance parameter is calculated in response to the data parameter being represented, and calculating a quantization parameter that corresponds to a number of bits used to represent each data parameter in response to the data parameter range and the performance parameter;

adding one or more quantization parameters at each node, wherein the quantization list is made up of the calculated quantization parameters of each node, and outputting a modified text file;

examining the quantization list of each child node of a grouping node and determining if a more efficient data compression may be performed by combining quantization lists at the grouping node and outputting a quantization parameter consolidated text file; and using the quantization lists to generate a binary file with the number of bits used to represent each data parameter being determined by its corresponding quantization parameter.

30. A binary encoder comprising:

a bounds determiner that accepts a text-based scene description and examines the scene description to determine the range of data parameters within the scene description, wherein the text-based scene description is a VRML-based file;

a quantization processor configured to receive the range of data parameters and a performance parameter, to determine if encoding would be benefited by adding quantization parameters to the scene description, and to determine quantization parameters and add them to the scene description; and an encoding engine configured to accept the scene description with the desired quantization parameters and to encode the scene description into a binary file and output the binary file.

31. A binary encoder comprising:

a bounds determiner that accepts a text-based scene description and examines the scene description to determine the range of data parameters within the scene description, wherein the text-based scene description is a XML-based file;

a quantization processor configured to receive the range of data parameters and a performance parameter, to determine if encoding would be benefited by adding quantization parameters to the scene description, and to determine quantization parameters and add them to the scene description; and an encoding engine configured to accept the scene description with the desired quantization parameters and to encode the scene description into a binary file and output the binary file.

32. A binary encoder comprising:

a bounds determiner that accepts a text-based scene description and examines the scene description to determine the range of data parameters within the scene description;

a quantization processor configured to receive the range of data parameters and a performance parameter, to determine if encoding would be benefited by adding quantization parameters to the scene description, and to determine quantization parameters and add them to the scene description, wherein determining the range of data parameters in a scene description includes parsing the entire scene description and determining the minimum and maximum value for individual data parameters; and an encoding engine configured to accept the scene description with the desired quantization parameters and to encode the scene description into a binary file and output the binary file.

33. A binary encoder comprising:

a bounds determiner that accepts a text-based scene description and examines the scene description to determine the range of data parameters within the scene description;

a quantization processor configured to receive the range of data parameters and a performance parameter wherein the performance parameter is received from a user, to determine if encoding would be benefited by adding quantization parameters to the scene description, and to determine quantization parameters and add them to the scene description; and an encoding engine configured to accent the scene description with the desired quantization parameters and to encode the scene description into a binary file and output the binary file.

34. A binary encoder comprising:

a bounds determiner that accepts a text-based scene description and examines the scene description to determine the range of data parameters within the scene description;

a quantization processor configured to receive the range of data parameters and a performance parameter, wherein said performance parameter is a predetermined value, to determine if encoding would be benefited by adding quantization parameters to the scene description, and to determine quantization parameters and add them to the scene description; and an encoding engine configured to accept the scene description with the desired quantization parameters and to encode the scene description into a binary file and output the binary file.

35. A binary encoder comprising:

a bounds determiner that accepts a text-based scene description and examines the scene description to determine the range of data parameters within the scene description;

a quantization processor configured to receive the range of data parameters and a performance parameter, wherein the performance parameter is calculated in response to the parameter being represented, to determine if encoding would be benefited by adding quantization parameters to the scene description, and to determine quantization parameters and add them to the scene description; and an encoding engine configured to accept the scene description with the desired quantization parameters and to encode the scene description into a binary file and output the binary file.

36. A binary encoder comprising:

a bounds determiner that accepts a text-based scene description and examines the scene description to determine the range of data parameters within the scene description;

a quantization processor configured to receive the range of data parameters and a performance parameter, to determine if encoding would be benefited by adding quantization parameters to the scene description, and to determine quantization parameters and add them to the scene description wherein the performance parameter is a value indicating an acceptable distortion level; and an encoding engine configured to accent the scene description with the desired quantization parameters and to encode the scene description into a binary file and output the binary file.

37. A binary encoder comprising:

a bounds determiner that accepts a text-based scene description and examines the scene description to determine the range of data parameters within the scene description;

a quantization processor configured to receive the range of data parameters and a performance parameter, to determine if encoding would be benefited by adding quantization parameters to the scene description, and to determine quantization parameters and add them to the scene description wherein the performance parameter is a value indicating an acceptable data rate; and an encoding engine configured to accept the scene description with the desired quantization parameters and to encode the scene description into a binary file and output the binary file.

38. A binary encoder comprising:

a bounds determiner that accepts a text-based scene description and examines the scene description to determine the range of data parameters within the scene description;

a quantization processor configured to receive the range of data parameters and a performance parameter, to determine if encoding would be benefited by adding quantization parameters to the scene description, and to determine quantization parameters and add them to the scene description wherein the performance parameter is a value indicating either an acceptable distortion level or an acceptable data rate and the quantization parameter is determined so as to minimize the distortion level or of the data rate, whichever was not received; and an encoding engine configured to accept the scene description with the desired quantization parameters and to encode the scene description into a binary file and output the binary file.

39. A binary encoder as defined in claim 37, wherein the performance parameter is a value indicating an acceptable distortion level and an acceptable data rate, and the quantization parameter is determined so as to minimize the distortion level without exceeding the acceptable data rate.

40. A binary encoder as defined in claim 37, wherein the performance parameter is a value indicating an acceptable distortion level and an acceptable data rate, and the quantization parameter is determined so as to minimize the data rate without exceeding the acceptable distortion level.

41. A binary encoder comprising:

a bounds determiner that accents a text-based scene description and examines the scene description to determine the range of data parameters within the scene description;

a quantization processor configured to receive the range of data parameters and a performance parameter, to determine if encoding would be benefited by adding quantization parameters to the scene description, and to determine quantization parameters and add them to the scene description; and an encoding engine configured to accept the scene description with the desired quantization parameters and to encode the scene description into a binary file and output the binary file wherein the encoding engine is a BIFS encoder.

42. A binary encoder comprising:

a bounds determiner that accepts a text-based scene description and examines the scene description to determine the range of data parameters within the scene description wherein the scene description is an animation;

a quantization processor configured to receive the range of data parameters and a performance parameter, to determine if encoding would be benefited by adding quantization parameters to the scene description, and to determine quantization parameters and add them to the scene description; and an encoding engine configured to accept the scene description with the desired quantization parameters and to encode the scene description into a binary file and output the binary file.

43. A binary encoder comprising:

a bounds determiner that accepts a text-based scene description and examines the scene description to determine the range of data parameters within the scene description;

a quantization processor configured to receive the range of data parameters and a performance parameter, to determine if encoding would be benefited by adding quantization parameters to the scene description, and to determine quantization parameters and add them to the scene description; and an encoding engine configured to accept the scene description with the desired quantization parameters and to encode the scene description into a binary file and output the binary file, wherein the output binary file is a sequence of Intra and Predictive frames.

44. A binary encoder as defined in claim 43, wherein an Intra frame establishes quantization parameters used for subsequent Predictive frames.

45. A binary encoder as defined in claim 43, further comprising:

means for receiving the range of data parameters, and the distortion level, from a user;

means for setting quantization parameters corresponding to the range and performance parameter in a first Intra frame;

means for using the quantization parameters in subsequent Predictive frames until the data parameters are out of the range; and means for creating another Interactive frame to establish new quantization parameters.

46. A binary encoder comprising:

an animation quantizer configured to accent quantization parameters and an animation frame of a scene description, and to output a quantized animation value;

a delay configured to accept the quantized animation value and store it for a desired length of time, and then to output a delayed quantized animation value;

a mixer configured to accept the quantized animation value and the delayed quantized animation value, and to output a difference animation value; and an arithmetic encoder configured to accept the difference animation value and to output a variable length encoding of the difference animation value wherein the variable length encoding is a binary file comprising a sequence of Intra and Predictive frames.

47. A binary encoder as defined in claim 46, wherein an Intra frame establishes quantization parameters used for subsequent predictive frames.

48. A binary encoder comprising:

an animation quantizer configured to accept quantization parameters and an animation frame of a scene description, wherein the scene description is a VRML-file, and to output a quantized animation value;

a delay configured to accept the quantized animation value and store it for a desired length of time, and then to output a delayed quantized animation value;

a mixer configured to accept the quantized animation value and the delayed quantized animation value, and to output a difference animation value; and an arithmetic encoder configured to accept the difference animation value and to output a variable length encoding of the difference animation value.

49. A binary encoder comprising:

an animation quantizer configured to accept quantization parameters and an animation frame of a scene description, wherein the scene description is a XML-based file, and to output a quantized animation value;

a delay configured to accept the quantized animation value and store it for a desired length of time, and then to output a delayed quantized animation value;

a mixer configured to accept the quantized animation value and the delayed quantized animation value, and to output a difference animation value; and an arithmetic encoder configured to accept the difference animation value and to output a variable length encoding of the difference animation value.

50. A binary encoder comprising:

an animation quantizer configured to accept quantization parameters and an animation frame of a scene description, and to output a quantized animation value;

a delay configured to accept the quantized animation value and store it for a desired length of time, and then to output a delayed quantized animation value; a mixer configured to accent the quantized animation value and the delayed quantized animation value, and to output a difference animation value; and an arithmetic encoder configured to accept the difference animation value and to output a variable length encoding of the difference animation value, wherein the variable length encoding is a BIFS-Anim file.

51. A binary encoder comprising:

an animation quantizer configured to accept quantization parameters and an animation frame of a scene description, and to output a quantized animation value;

a delay configured to accept the quantized animation value and store it for a desired length of time, and then to output a delayed quantized animation value;

a mixer configured to accept the quantized animation value and the delayed quantized animation value, and to output a difference animation value; and an arithmetic encoder configured to accept the difference animation value and to output a variable length encoding of the difference animation value, wherein the variable length encoding is a BIFS file.

52. A binary encoder comprising:

an animation quantizer configured to accept quantization parameters and an animation frame of a scene description, and to output a quantized animation value;

a delay configured to accept the quantized animation value and store it for a desired length of time, and then to output a delayed animation value;

a mixer configured to accent the quantized animation value and the delayed quantized animation value, and to output a difference animation value; and an arithmetic encoder configured to accept the difference animation value and to output a variable length encoding of the difference animation value;

means for receiving a range of data parameters, and a performance parameter; means for setting the quantization parameters corresponding to the range and performance parameter in a first Intra frame;

means for using the quantization parameters in subsequent Predictive frames until the data parameters are out of the range; and means for creating another Intra frame to establish new quantization parameters.

53. A binary encoder as defined in claim 52, wherein the performance parameter is a value indicating an acceptable distortion level.

54. A binary encoder as defined in claim 52, wherein the performance parameter is a value indicating an acceptable data rate.

55. A system as defined in claim 52, wherein the performance parameter is a value indicating either an acceptable distortion level or acceptable data rate, and the quantization parameter is determined so as to minimize the distortion level or of the data rate, whichever was not received.

56. A system as defined in claim 52, wherein the performance parameter is a value indicating an acceptable distortion level and an acceptable data rate, and the quantization parameter is determined so as to minimize the distortion level without exceeding the acceptable data rate.

57. A system as defined in claim 52, wherein the performance parameter is a value indicating an acceptable distortion level and an acceptable data rate, and the quantization parameter is determined so as to minimize the data rate without exceeding the acceptable distortion level.

58. A binary encoder as defined in claim 52, wherein the performance parameter is received from a user.

59. A binary encoder as defined in claim 52, wherein the performance parameter is a predetermined value.

60. A binary encoder as defined in claim 52, wherein the performance parameter is calculated in response to the parameter being represented.

* * * * *